(12) United States Patent
Arafat

(10) Patent No.: US 9,023,211 B2
(45) Date of Patent: May 5, 2015

(54) VACUUM MEMBRANE DISTILLATION (VMD) USING ASPIRATOR TO GENERATE VACUUM PRESSURE

(71) Applicant: Masdar Institute of Science and Technology, Abu Dhabi (AE)

(72) Inventor: Hassan Ali Arafat, Abu Dhabi (AE)

(73) Assignee: Masdar Institute of Science and Technology, Abu Dhabi (AE)

( * ) Notice: Subject to any disclaimer, the term of this patent is extended or adjusted under 35 U.S.C. 154(b) by 1 day.

(21) Appl. No.: 13/716,662

(22) Filed: Dec. 17, 2012

(65) Prior Publication Data

US 2013/0153497 A1 Jun. 20, 2013

Related U.S. Application Data

(60) Provisional application No. 61/570,923, filed on Dec. 15, 2011.

(51) Int. Cl.

| | | |
|---|---|---|
| *B01D 15/00* | (2006.01) | |
| *B01D 24/00* | (2006.01) | |
| *C02F 1/44* | (2006.01) | |
| *B01D 35/18* | (2006.01) | |
| *B01D 61/36* | (2006.01) | |

(52) U.S. Cl.
CPC ............ *B01D 61/366* (2013.01); *B01D 61/364* (2013.01); *B01D 2311/04* (2013.01); *B01D 2313/243* (2013.01)

(58) Field of Classification Search
CPC ........... B01D 61/364; B01D 2311/103; B01D 2311/106; B01D 61/362; B01D 2313/38; B01D 2313/12; B01D 2311/06; C02F 1/447; C02F 1/448; C02F 2303/08
USPC .................. 210/640, 175, 180, 188, 90, 416.2
See application file for complete search history.

(56) References Cited

U.S. PATENT DOCUMENTS

| | | | | |
|---|---|---|---|---|
| 5,102,550 | A * | 4/1992 | Pizzino et al. ................ 210/640 |
| 5,753,008 | A * | 5/1998 | Friesen et al. ..................... 95/45 |
| 6,273,937 | B1 * | 8/2001 | Schucker ........................... 95/45 |
| 6,663,778 | B1 * | 12/2003 | Bader ........................... 210/640 |
| 7,497,895 | B2 * | 3/2009 | Sabottke ............................ 95/45 |
| 8,496,806 | B2 * | 7/2013 | Yukumoto et al. .............. 210/85 |
| 2007/0114177 | A1 | 5/2007 | Sabottke |

(Continued)

OTHER PUBLICATIONS

International Search Report dated Apr. 19, 2013, received in corresponding PCT Application No. PCT/IB2012/002728, 5 pgs.

(Continued)

*Primary Examiner* — Ana Fortuna
(74) *Attorney, Agent, or Firm* — Grossman Tucker Perreault & Pfleger, PLLC

(57) ABSTRACT

A VMD system and method uses an aspirator to generate a vacuum pressure for drawing permeate from a membrane module. The aspirator generates the vacuum pressure by receiving and passing a circulating liquid and combines the permeate with the circulating liquid such that the permeate condensates in the circulating liquid. Using an aspirator (e.g., instead of a vacuum pump) allows a more efficient and cost-effective operation of the VMD system and method, particularly in a desalination application. A VMD system and method using an aspirator may be used in desalination and other applications including, without limitation, environmental cleanup (e.g., removal of volatile organic chemicals from water) and food and medical applications.

16 Claims, 3 Drawing Sheets

(56) References Cited

U.S. PATENT DOCUMENTS

| | | |
|---|---|---|
| 2008/0011680 A1* | 1/2008 | Partridge et al. ............... 210/640 |
| 2009/0166264 A1* | 7/2009 | Duraiswamy et al. ........ 208/218 |
| 2010/0089830 A1 | 4/2010 | Cath et al. |
| 2010/0090165 A1* | 4/2010 | Bratton et al. ................ 252/364 |
| 2011/0124068 A1* | 5/2011 | Evanko et al. ................ 435/157 |

OTHER PUBLICATIONS

PCT Written Opinion dated Apr. 19, 2013, received in corresponding PCT Application No. PCT/IB2012/002728, 5 pgs.

Pangarkar, L. B., "The Heat and Mass Transfer Phenomena in Vacuum Membrane Distillation for Desalination", International Journal of Chemical and Biological Engineering 3:1, 2010, pp. 33-38.

* cited by examiner

VACUUM MEMBRANE DISTILLATION (VMD) USING ASPIRATOR TO GENERATE VACUUM PRESSURE

CROSS-REFERENCE TO RELATED APPLICATIONS

The present application claims the benefit of U.S. Provisional Patent Application Ser. No. 61/570,923 filed Dec. 15, 2011, which is fully incorporated herein by reference.

TECHNICAL FIELD

The present invention relates to membrane distillation and more particularly, to a system and method for vacuum membrane distillation (VMD) using an aspirator to generate vacuum pressure for drawing permeate from a VMD module.

BACKGROUND INFORMATION

Membrane Distillation (MD) refers to a thermally driven transport of vapor through non-wetted porous hydrophobic membranes with the driving force being the vapor pressure difference between the two sides of the membrane pores. MD may be used for various applications including desalination, environmental cleanup (e.g., removal of volatile organic chemicals from water), and food and medical applications. Known MD configurations include direct contact membrane distillation (DCMD), sweeping gas membrane distillation (SGMD), vacuum membrane distillation (VMD), and air gap membrane distillation (AGMD).

Using MD processes for desalination has several advantages compared to other membrane-based desalination processes, such as reverse osmosis (RO). These advantages include the fitness for intermittent energy supply in an MD process, the membrane tolerance for occasional dry-out, the ability to use the process with direct solar heat without heat storage, and the possibility of using MD in small-scale individual units. Although research has been conducted on water desalination using MD processes, particularly in the VMD configuration, is currently still in the laboratory R&D phase, MD has not yet become commercially viable for desalination. One reason for non-commercialization is the high cost of water produced using this process (e.g., estimated at $5-20 per cubic meter of produced water), which makes it non-competitive compared to other desalination processes, such as RO.

In one type of VMD system 100, as shown in FIG. 1, a VMD module 110 separates water vapor and brine from salt water pumped from a salt water feed tank 112. The salt water is pumped by a feed pump 114 and heated by a water heater 116. A vacuum pump 120 generates vacuum pressure to draw the vapor out of a permeate chamber in the VMD module 110. The water vapor then passes through a condenser 122 to condensate and recover the water. A liquid or moisture trap 124 may be used to protect the vacuum pump 120.

There are several problems with this design. The power cost for the vacuum pump is relatively high. Also, recovery of water is performed by condensing the vapor using a heat exchanger, and the cost of running a coolant in the heat exchanger adds to the cost of produced water. Further, the recovery of the evacuated vapor in the condenser may be incomplete, unless condensation is done at a very low temperature with a significant energy consumption. An incomplete recovery of evacuated vapor means that a portion of the targeted product (i.e., water vapor) is lost and un-utilized. As a result, the overall cost of production, per amount of water produced, increases.

The incomplete recovery of vapor may also lead to vapor penetrating the vacuum pump. Vacuum pumps should be sealed and lubricated, and both the seals and lubricant are negatively affected by the entrance of vapor into the pump. Despite the attempt to use a trap to protect the pump, minute amounts of vapor will inevitably damage the vacuum pump on the long run.

BRIEF DESCRIPTION OF THE DRAWINGS

These and other features and advantages will be better understood by reading the following detailed description, taken together with the drawings wherein.

DETAILED DESCRIPTION

A VMD system and method, consistent with embodiments described herein, uses an aspirator to generate a vacuum pressure for drawing permeate from a membrane module. The aspirator generates the vacuum pressure by receiving and passing a circulating liquid and combines the permeate with the circulating liquid such that the permeate condensates in the circulating liquid. Using an aspirator (i.e., instead of a vacuum pump) allows a more efficient and cost-effective operation of the VMD system and method, particularly in a desalination application. Although the example embodiments described herein refer to a desalination application, a VMD system and method using an aspirator may be used in other applications including, without limitation, environmental cleanup (e.g., removal of volatile organic chemicals from water) and food and medical applications.

Figure 1:
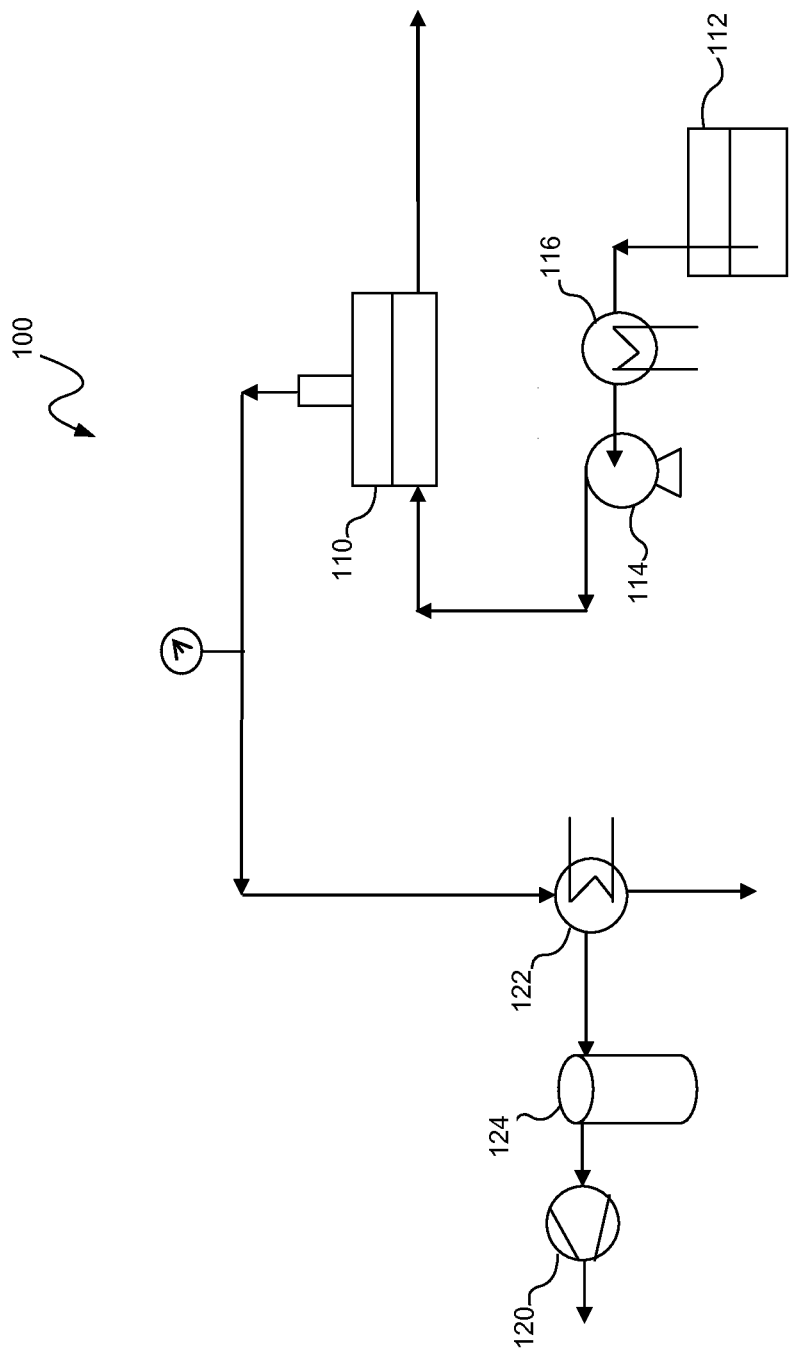
FIG. 1 is a schematic diagram of a conventional vacuum membrane distillation (VMD) system.
Figure 2:
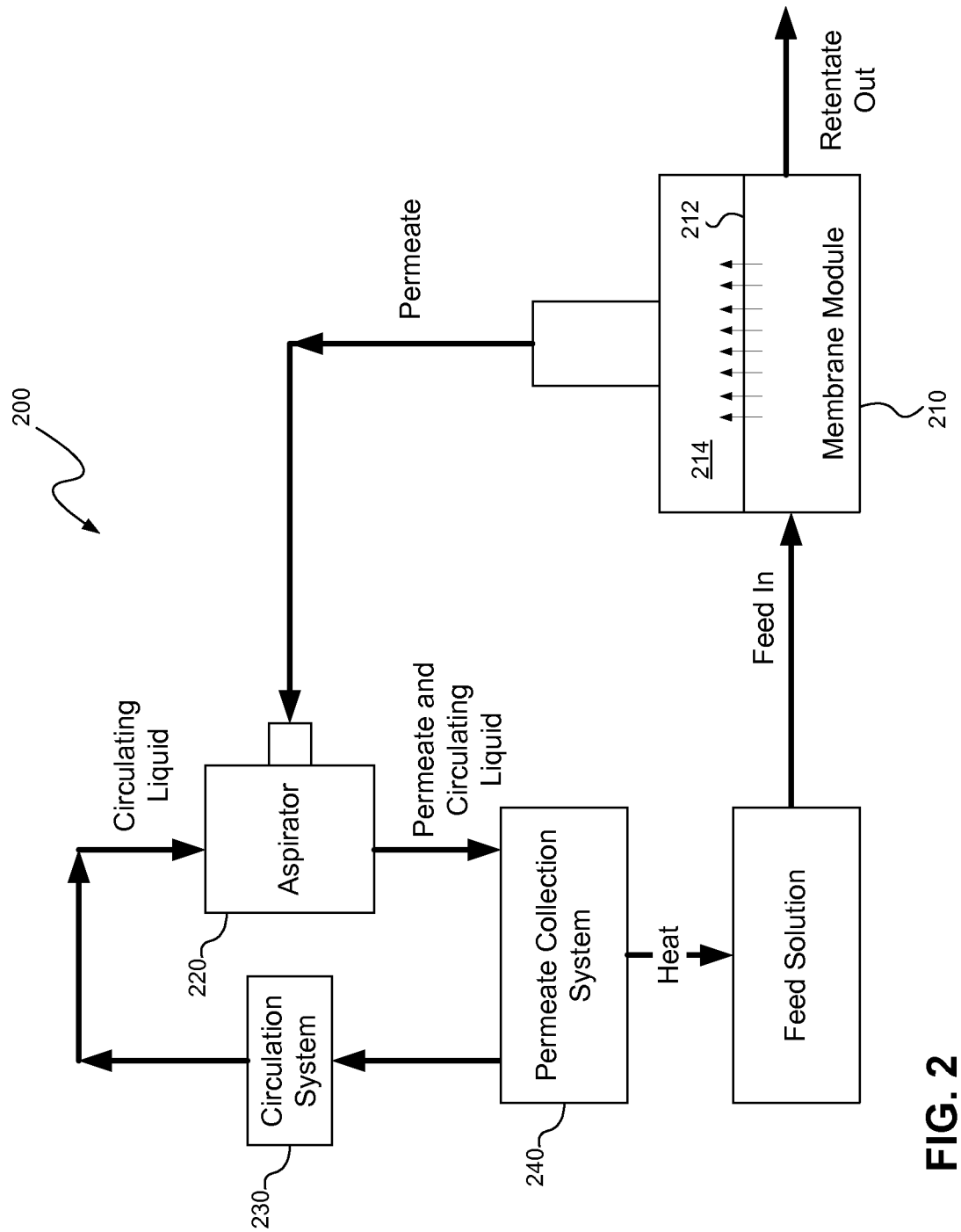
FIG. 2 is a schematic diagram of a VMD system using an aspirator, consistent with one embodiment of the present disclosure.

Referring to FIG. 2, a VMD system 200, consistent with embodiments described herein, generally includes a membrane module 210 and an aspirator 220. The membrane module 210 receives a feed solution and uses membrane distillation to separate the feed solution into a permeate and a retentate. The retentate is passed out of the membrane module 210 for recovery or recirculation back into the membrane module 210. The aspirator 220 generates the vacuum pressure to draw the permeate from the membrane module 210 for recovery. The aspirator 220 includes any device that, when a liquid passes through, produces a vacuum by means of the Venturi effect based on Bernoulli's principle. The VMD system 200 also includes a circulation system 230 for circulating liquid through the aspirator 220 and a permeate collection system 240 for collecting permeate that has been combined with the circulating liquid when drawn in by the aspirator 220.

The permeate is generally a vapor when separated in the membrane module 210 and the circulating liquid should be of the same material as the permeate vapor such that the permeate vapor condensates into the circulating liquid when combined in the aspirator 220. When the feed solution is an aqueous solution and the permeate is a pure water vapor, for example, the circulating liquid should include pure water such that the water vapor permeate condensates into the circulating water. This facilitates collection of permeate in the permeate collection system 240. Over time, heat will accumulate in the permeate collection system 240 (in the form of elevated temperature) due to the condensation of permeate vapor in the circulating liquid. This accumulated heat may optionally be used to pre-heat the feed solution (e.g., using a heat exchanger) before being provided to the membrane module 210.

The membrane module 210 generally includes a membrane 212 capable of separating the permeate and the retentate while allowing the permeate to pass through the membrane 212 into a permeate chamber 214 of the membrane module. The aspirator 220 thus creates a vacuum in the permeate chamber 214 to draw the permeate from the permeate chamber 214 and into the circulating liquid. Various membranes may be used in the membrane module 210 depending upon the application. Membranes may include hydrophobic membranes such as, for example, micro porous hydrophobic polytetrafluoroethelyne (PTFE) membranes, polyvinylidenefluoride (PVDF) membranes, polyethylene (PE) membranes, and polypropylene (PP) membranes.

The circulation system 230 may include one or more circulation pumps, valves, gauges, and other components to control circulation of liquid through the aspirator 220. Various types of circulating liquids may be used depending upon the application and the nature of the permeate material. The permeate collection system 240 may include a tank and/or other components to collect and accumulate permeate received from the aspirator 220, which may then be recovered. The VMD system 200 may also include other components and devices known to those skilled in the art for use in a VMD process.

Using the aspirator 220 to generate the vacuum pressure and at the same time condensate the permeate vapor into the circulating liquid allows the VMD system 200 to be simplified as compared to the conventional VMD system and eliminates some of the problems of the conventional VMD system, for example, by eliminating the vacuum pump, liquid or moisture trap and condenser. Replacing the vacuum pump with a simple aspirator device with no moving parts may significantly reduce the cost and complexity of the system. Although the circulation system 230 may include a liquid circulation pump, such a pump generally has a lower power cost than a vacuum pump. The VMD system 200 also enables easier control of the vacuum level by controlling the flow rate of liquid through the aspirator 220. Eliminating the condenser also significantly reduces the cost of operating the system and further eliminates or reduces the problems of incomplete recovery of the permeate vapor and the penetration by unrecovered permeate vapor into other components of the system. Pre-heating the feed solution with accumulated heat produced by the condensation in the circulating liquid may also reduce the cost of heating the feed solution, for example, by reducing the load on a heater used to heat the feed solution.

Figure 3:
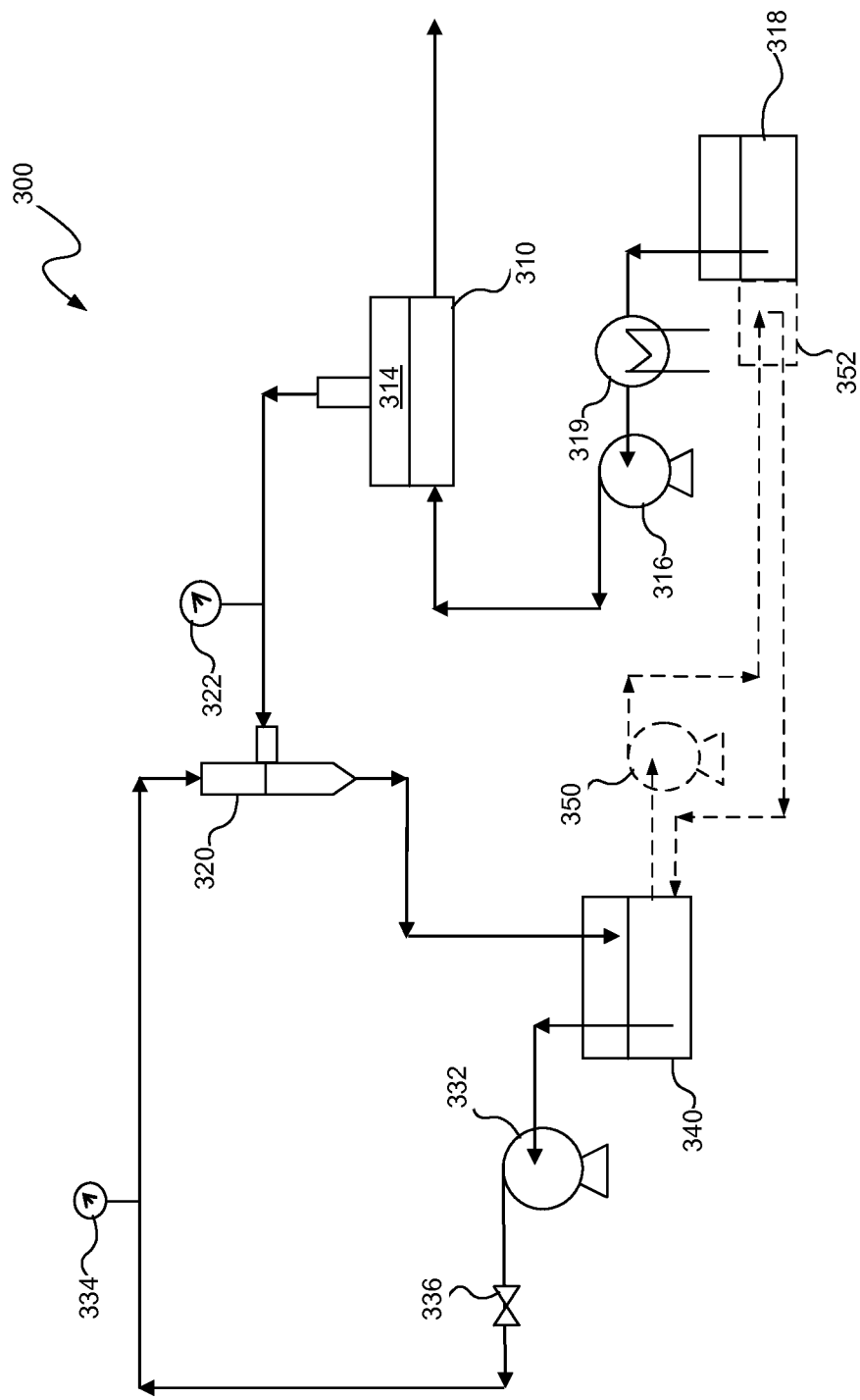
FIG. 3 is a schematic diagram of a VMD system using an aspirator, consistent with another embodiment of the present disclosure.

Referring to FIG. 3, an embodiment of a VMD system 300 for use in a desalination application is described in greater detail. In this embodiment, a VMD module 310 receives salt water from a salt water feed pump 316 that pumps the salt water from a salt water feed tank 318 and through a water heater 319 for heating the salt water. The VMD module 310 separates water vapor (permeate) from brine (retentate) and passes the water vapor into a permeate chamber 314. The brine may be passed out of the VMD module 310.

An aspirator 320 generates the vacuum pressure to draw the water vapor from the permeate chamber 314 as water is circulated through the aspirator 320 by a circulation pump 332. The aspirator 320 combines the permeate water vapor with the circulating water such that the water vapor condensates into the circulating water. The water is allowed to accumulate in a permeate collection tank 340, and the circulation pump 332 draws the circulating water from the permeate collection tank 340. Water may be recovered from the permeate collection tank 340 as needed. The VMD system 300 may optionally include a pump 350 for pumping the water (at an elevated temperature) from the permeate collection tank 340 to a pre-heater 352, such as a heat exchanger, for pre-heating the salt water in the feed tank 318.

The vacuum pressure generated by the aspirator 320 may be controlled by controlling the flow rate of the circulating liquid through the aspirator 320. The illustrated embodiment of the VMD system 300 also includes a vacuum pressure gauge 322 to monitor the vacuum pressure and a flow pressure gauge 334 to monitor the pressure of the circulating water. A flow control valve 336 may be used to adjust the flow of circulating liquid and thus adjust the vacuum pressure. The circulating water is circulated with a flow rate through the aspirator 320 sufficient to provide a vacuum pressure capable of separating the water from the brine in the VMD module 310, for example, at least about −0.1 bar (gauge). In one example based on modeling of the aspirator system, circulating feed water with a flow rate about 13 kg/s, a temperature of about 25° C., and a pressure of about 10 bar generated a vacuum pressure in the permeate chamber 314 of the VMD module 310 of about −0.8 bar (gauge). This resulted in a pure water vapour flow of 0.5 kg/s coming from the salt water. Other components (e.g., other pumps or flow control apparatus) may also be used to cause the water to circulate and/or to control circulation through the aspirator 320 at the desired flow rate or pressure and to achieve a desired vacuum pressure.

By lowering the cost and eliminating other problems with conventional VMD systems and methods, the VMD system and method, consistent with the present disclosure, may provide a significant advantage over other MD techniques for commercial applications such as desalination. VMD systems and methods, consistent with the present disclosure, may be used, for example, in large central desalination plants or in small, decentralized units, which may be ideal for applications such as remote, off-grid communities, off-shore applications (e.g., on board ships), in remote coastal resorts, and in disaster relief cases.

Consistent with an embodiment, a vacuum membrane distillation (VMD) system includes a membrane module configured to receive a feed solution and including a membrane configured to separate a permeate from a retentate in the feed solution. The VMD also includes an aspirator configured to generate a vacuum pressure to draw the permeate from the membrane module. The aspirator is configured to generate the vacuum pressure by receiving and passing a circulating liquid and is configured to combine the permeate with the circulating liquid such that the permeate condensates in the circulating liquid. The VMD system further includes a circulation system configured to circulate the circulating liquid through the aspirator.

Consistent with another embodiment, a VMD method includes: circulating a circulating liquid and generating a vacuum pressure in response to the circulating liquid using the Venturi effect; receiving a feed solution in a membrane module; separating a permeate from a retentate in the feed solution in the membrane module; drawing the permeate from the membrane module using the vacuum pressure generated by the circulating liquid; and combining the permeate with the circulating liquid.

Consistent with a further embodiment, a desalination system includes a source of salt water, a heater configured to heat the salt water, and a membrane module configured to receive the salt water and including a membrane configured to separate water vapor from brine in the salt water. The desalination system also includes an aspirator configured to generate a vacuum pressure to draw the water vapor from the membrane module. The aspirator is configured to generate the vacuum pressure by receiving and passing circulating water through the aspirator and is configured to combine the water vapor with the circulating water such that the permeate condensates in the circulating water. The desalination system further includes a circulation pump configured to circulate the circulating water through the aspirator.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A vacuum membrane distillation (VMD) system comprising:
   a membrane module configured to receive a feed solution and including a membrane configured to separate a permeate from a retentate in the feed solution;
   an aspirator configured to generate a vacuum pressure to draw the permeate from the membrane module, wherein the aspirator is configured to generate the vacuum pressure by receiving and passing a circulating liquid, and wherein the aspirator is configured to combine the permeate with the circulating liquid such that the permeate condensates in the circulating liquid;
   a circulation system configured to circulate the circulating liquid through the aspirator;
   a permeate collection system configured to collect the permeate condensated in the circulating liquid, and wherein the permeate collection system is configured to supply the permeate together with the circulating liquid to the circulation system; and
   wherein the circulation system circulates the circulating liquid and the collected permeate between the aspirator and the permeate collection system tank without heating or cooling the circulating liquid between the aspirator and the permeate collection system tank.

2. The VMD system of claim 1 further comprising a heat transfer system for transferring heat from the permeate collection system to preheat the feed solution.

3. The VMD system of claim 1 wherein the circulation system includes a circulation pump for circulating the circulating liquid including the permeate through the aspirator.

4. The VMD system of claim 1 wherein the circulation system includes a flow control apparatus for controlling a flow of the circulating liquid and thereby controlling the vacuum pressure.

5. The VMD system of claim 1 further comprising a heater configured to heat the feed solution.

6. The VMD system of claim 1 further comprising a feed solution tank for holding the feed solution.

7. The VMD system of claim 1 wherein the membrane module includes a hydrophobic membrane.

8. A vacuum membrane distillation (VMD) method comprising:
   circulating a circulating water through an aspirator to generate a vacuum pressure in response to the circulating water using the Venturi effect;
   receiving a feed solution in a membrane module;
   separating a permeate water vapor from a retentate in the feed solution in the membrane module;
   drawing the permeate water vapor from the membrane module using the vacuum pressure generated by the circulating water; and
   combining the permeate water vapor with the circulating water such that the permeate water vapor condensates in the circulating water and is circulated together with the circulating water.

9. The VMD method of claim 8 wherein the feed solution is salt water and the retentate is brine.

10. The VMD method of claim 8 further comprising:
    heating the feed solution.

11. The VMD method of claim 8 further comprising:
    pre-heating the feed solution with heat accumulated in the circulating water due to condensation of the permeate water vapor.

12. The VMD method of claim 8 further comprising:
    controlling the flow of the circulating water to control the vacuum pressure.

13. The VMD method of claim 8 wherein the circulating water is circulated with a flow rate through the aspirator sufficient to provide a vacuum pressure of at least about −0.1 bar (gauge).

14. A desalination system comprising:
    a source of salt water;
    a heater configured to heat the salt water;
    a membrane module configured to receive the salt water and including a membrane configured to separate water vapor from brine in the salt water;
    an aspirator configured to generate a vacuum pressure to draw the water vapor from the membrane module, wherein the aspirator is configured to generate the vacuum pressure by receiving and passing circulating water through the aspirator, and wherein the aspirator is configured to combine the water vapor with the circulating water such that the permeate condensates in the circulating water; and
    a circulation pump configured to circulate the circulating water through the aspirator.

15. The desalination system of claim 14 further comprising a permeate collection tank configured to collect water received from the aspirator.

16. The desalination system of claim 14 further comprising a flow control apparatus configured to control flow of the circulating liquid to control the vacuum pressure.

* * * * *